US012586590B2

(12) United States Patent
Zhang et al.

(10) Patent No.: US 12,586,590 B2
(45) Date of Patent: Mar. 24, 2026

(54) TECHNIQUES FOR IMPROVED ZERO-SHOT VOICE CONVERSION WITH A CONDITIONAL DISENTANGLED SEQUENTIAL VARIATIONAL AUTO-ENCODER

(71) Applicant: Tencent America LLC, Palo Alto, CA (US)

(72) Inventors: Chunlei Zhang, Bellevue, WA (US); Jiachen Lian, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 340 days.

(21) Appl. No.: 17/826,987

(22) Filed: May 27, 2022

(65) Prior Publication Data

US 2023/0386479 A1 Nov. 30, 2023

(51) Int. Cl.
*G10L 15/02* (2006.01)
*G10L 19/00* (2013.01)

(52) U.S. Cl.
CPC .................................... *G10L 19/00* (2013.01)

(58) Field of Classification Search
None
See application file for complete search history.

(56) References Cited

U.S. PATENT DOCUMENTS 5,598,507 A * 1/1997 Kimber .................. G10L 15/07 704/250
10,347,241 B1 * 7/2019 Meng .................... G10L 15/063
11,580,965 B1 * 2/2023 Sunkara ................. G06N 3/045
12,272,371 B1 * 4/2025 Giri ........................ G10L 21/038
2014/0058731 A1 * 2/2014 Tyagi .................... G10L 15/063 704/243
2015/0127337 A1 * 5/2015 Heigold ................ G10L 15/183 704/232
2015/0279351 A1 * 10/2015 Nguyen .................. G10L 15/08 704/251
2016/0099007 A1 * 4/2016 Alvarez ................ G10L 21/034 704/225
2016/0232440 A1 * 8/2016 Gregor ................... G06N 3/044
(Continued)

OTHER PUBLICATIONS

International Search Report dated Feb. 17, 2023 in International Application No. PCT/US22/43314.
(Continued)

*Primary Examiner* — Jakieda R Jackson
(74) *Attorney, Agent, or Firm* — Sughrue Mion, PLLC

(57) ABSTRACT

A method, system, apparatus, and computer-readable medium for voice conversion using a conditional disentangled sequential variational auto-encoder (C-DSVAE) is provided. The method, performed by at least one processor, includes receiving input speech segments, encoding the input speech segments via a shared encoder to generate a speaker embedding and a content embedding, and encoding a posterior distribution of the speaker embedding via a speaker encoder and encoding a posterior distribution of the content embedding via a content encoder to obtain encoded results. The method further includes enabling a content bias, reshaping the content embedding using the content bias, and generating a reconstructed speech output based on the encoded results and the reshaped content embedding.

14 Claims, 5 Drawing Sheets

(56) References Cited

U.S. PATENT DOCUMENTS

2016/0267924 A1* 9/2016 Terao ...................... G10L 25/51
2018/0012602 A1* 1/2018 Komissarchik ......... G10L 17/02
2018/0012603 A1* 1/2018 Komissarchik ......... G10L 17/04
2019/0122101 A1* 4/2019 Lei ......................... G06N 3/044
2020/0082916 A1* 3/2020 Polykovskiy .......... G06N 3/045
2020/0090069 A1* 3/2020 Mandt ...................... G06N 3/08
2020/0372339 A1* 11/2020 Che ..................... H03M 7/3059
2020/0380952 A1 12/2020 Zhang et al.
2020/0401916 A1* 12/2020 Rolfe ....................... G06N 7/01
2021/0034969 A1* 2/2021 Wayne ................... G06N 3/084
2021/0043216 A1* 2/2021 Wang ...................... G10L 17/18
2021/0049460 A1* 2/2021 Ahn ....................... G06N 3/047
2021/0065066 A1* 3/2021 Xue ....................... G16H 50/30
2021/0142120 A1 5/2021 Min et al.
2021/0174784 A1* 6/2021 Min ......................... G06N 3/08
2021/0183373 A1* 6/2021 Moritz ................... G06N 3/045
2021/0272571 A1* 9/2021 Balasubramaniam .. G10L 15/02
2021/0280202 A1 9/2021 Wang et al.
2021/0350786 A1* 11/2021 Chen ..................... G10L 15/063
2021/0358577 A1* 11/2021 Zhang .................... G16H 50/70
2021/0397895 A1* 12/2021 Sun ........................ G06N 3/045
2021/0406764 A1* 12/2021 Sha .................... G05B 19/0428
2022/0084371 A1* 3/2022 Semichev ............... H04L 63/08
2022/0121934 A1* 4/2022 Duan ..................... G06N 3/045
2022/0171989 A1* 6/2022 Min ....................... G06N 20/00
2022/0189456 A1* 6/2022 Pang ..................... G10L 21/007
2022/0223066 A1* 7/2022 Chen ...................... G10L 15/16
2022/0246132 A1* 8/2022 Zhang ...................... G06N 3/09
2023/0084333 A1* 3/2023 Clinchant ................ G06N 3/09
704/2
2023/0206898 A1* 6/2023 Stanton ................. G10L 13/027
704/260
2023/0252972 A1* 8/2023 Harazi .................... G10L 25/63
704/259
2023/0326445 A1* 10/2023 Adam ................... G10L 13/033
704/260
2024/0062743 A1* 2/2024 Elias ....................... G10L 13/08

OTHER PUBLICATIONS

Written Opinion dated Feb. 17, 2023 in International Application No. PCT/US22/43314.

Bai et al., “Contrastively Disentangled Sequential Variational Autoencoder”, NeurIPS, 2021, <https://arxiv.org/pdf/2110.12091.pdf>, pp. 1-25 (25 pages total).

* cited by examiner

TECHNIQUES FOR IMPROVED ZERO-SHOT VOICE CONVERSION WITH A CONDITIONAL DISENTANGLED SEQUENTIAL VARIATIONAL AUTO-ENCODER

BACKGROUND

Field

Apparatuses and methods consistent with example embodiments of the present disclosure relate to zero-shot voice conversion (VC) using a conditional disentangled sequential variational auto-encoder (C-DSVAE) that adopts a disentangled sequential variational auto-encoder (DSVAE) basline and enables content bias as a condition and reshapes the content embedding sampled from the posterior distribution to achieve improved zero-shot VC.

Description of Related Art

In related art, VC systems utilize technological advancements from statistical modeling to deep learning and have made a major shift in how the pipeline develops. For example, VC approaches with parallel training data utilize a conversion module to map source acoustic features to target acoustic features. This method of VC requires that the speaker of the source-target VC pair be aligned before the mapping. However, sequence-to-sequence models (without the alignment prerequisite) may result in better VC performance. For VC with non-parallel data, direct feature mapping is difficult. Instead, speaking styles and content representations may explicitly be learned and a neural network is trained as a decoder to reconstruct the acoustic feature, with the assumption that the decoder can also generalize well when the content and speaker style is swapped during the conversion. Among these learned approaches, phonetic posteriorgrams (PPGs) and pre-trained speaker embeddings are widely used as the content and speaking style representations. However, developing such learned systems require large amounts of external data with rich transcriptions and speaker labels.

For zero-shot VC, related art employ encoder-decoder frameworks wherein the encoder decomposes the speaking style and the content information into the latent embedding, and the decoder generates a voice sample by combining both the disentangled information (i.e., the speaking style embedding and the content embedding). Nevertheless, these models require a positive pair of utterances (i.e., two utterances coming from the same speaker) during training, and the systems must rely on pre-trained speaker models.

Improvements have been made with generative adversarial networks (GAN) based VC systems. The GAN method usually assumes that the speaker of the source-target VC pair is pre-known, which limits the real world application of such models. Additionally, many regularization terms have to be applied in the training process of GAN systems, which imposes generalization doubts to such systems for zero-shot non-parallel VC scenarios, and thus further limiting this method.

Related art also describe a framework with disentangled sequential variational autoencoder (DSVAE) as the backbone for information decomposition which demonstrates that simultaneous disentangling of content embeddings and speaker embeddings from one utterance is feasible for zero-shot VC. However, the randomness of initialized prior distributions of the content branch in the DSVAE baseline forces the content embedding to reduce the phonetic-structure information during the learning process, which is not a desired property.

SUMMARY

One or more example embodiments of the present disclosure provide a method and an apparatus for improving zero-shot voice conversion using a conditional disentangled sequential variational auto-encoder (C-DSVAE).

According to embodiments, a method, performed by at least one processor of a computing device, for voice conversion using a conditional disentangled sequential variational auto-encoder (C-DSVAE), includes receiving input speech segments; encoding the input speech segments via a shared encoder to generate a speaker embedding and a content embedding; encoding a posterior distribution of the speaker embedding via a speaker encoder and encoding a posterior distribution of the content embedding via a content encoder to obtain encoded results; enabling a content bias, and reshaping the content embedding using the content bias; and generating a reconstructed speech output based on the encoded results and the reshaped content embedding to generate a reconstructed speech output.

The method may further include wherein the content embedding and a target embedding are concatenated when inferencing to obtain a voice conversion speech output.

The method may further include wherein the content bias is one of forced alignment or pseudo labels.

The method may further include wherein the voice conversion is performed on voice cloning toolkit (VCTK) datasets.

The method may further include wherein segments are randomly selected from the input speech segments for training the C-DSVAE.

The method may further include wherein a total loss is based on at least (i) the reconstruction loss between the input speech segments and the reconstructed speech output, (ii) a prior and a posterior distribution of the speaker embedding, and (iii) a KL-Divergence between a conditional prior and posterior distribution of the content embedding.

The method may further include, wherein the reconstructed speech output is generated in the form of a spectrogram, converting the reconstructed speech output into a waveform.

According to embodiments, an apparatus for voice conversion using a conditional disentangled sequential variational auto-encoder (C-DSVAE), may include at least one memory configured to store program code; and at least one processor configured to read the program code and operate as instructed by the program code. The program code including receiving code configured to cause the at least one processor to receive input speech segments; first encoding code configured to cause the at least one processor to encode the input speech segments via a shared encoder to generate a speaker embedding and a content embedding; second encoding code configured to cause the at least one processor to encode a posterior distribution of the speaker embedding via a speaker encoder and encode a posterior distribution of the content embedding via a content encoder to obtain encoded results; enabling code configured to cause the at least one processor to enable a content bias, and reshape the content embedding using the content bias; and generating code configured to cause the at least one processor to generate a reconstructed speech output based on the encoded results and the reshaped content embedding.

The apparatus may further include wherein the content embedding and a target embedding are concatenated when inferencing to obtain a voice conversion speech output.

The apparatus may further include wherein the content bias is one of forced alignment or pseudo labels.

The apparatus may further include wherein the voice conversion is performed on voice cloning toolkit (VCTK) datasets.

The apparatus may further include wherein segments are randomly selected from the input speech segments for training the C-DSVAE.

The apparatus may further include wherein a total loss is based on at least (i) the reconstruction loss between the input speech segments and the reconstructed speech output, (ii) a prior and a posterior distribution of the speaker embedding, and (iii) a KL-Divergence between a conditional prior and posterior distribution of the content embedding.

The apparatus may further include, wherein the reconstructed speech output is generated in the form of a spectrogram, converting code configured to cause the at least one processor to convert the reconstructed speech output into a waveform According to example embodiments, a non-transitory computer-readable medium includes computer-executable instructions voice conversion using a conditional disentangled sequential variational auto-encoder (C-DSVAE) by an apparatus, wherein the computer-executable instructions, when executed by at least one processor of the apparatus, cause the apparatus to receive input speech segments; encode the input speech segments via a shared encoder to generate a speaker embedding and a content embedding; encode a posterior distribution of the speaker embedding via a speaker encoder and encode a posterior distribution of the content embedding via a content encoder to obtain encoded results; enable a content bias, and reshape the content embedding using the content bias; and generate a reconstructed speech output based on the encoded results and the reshaped content embedding.

The non-transitory computer-readable medium may further include wherein the content embedding and a target embedding are concatenated when inferencing to obtain a voice conversion speech output.

The non-transitory computer-readable medium may further include wherein the content bias is one of forced alignment or pseudo labels.

The non-transitory computer-readable medium may further include wherein the voice conversion is performed on voice cloning toolkit (VCTK) datasets.

The non-transitory computer-readable medium may further include wherein segments are randomly selected from the input speech segments for training the C-DSVAE.

The non-transitory computer-readable medium may further include wherein a total loss is based on at least (i) the reconstruction loss between the input speech segments and the reconstructed speech output, (ii) a prior and a posterior distribution of the speaker embedding, and (iii) a KL-Divergence between a conditional prior and posterior distribution of the content embedding.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1:
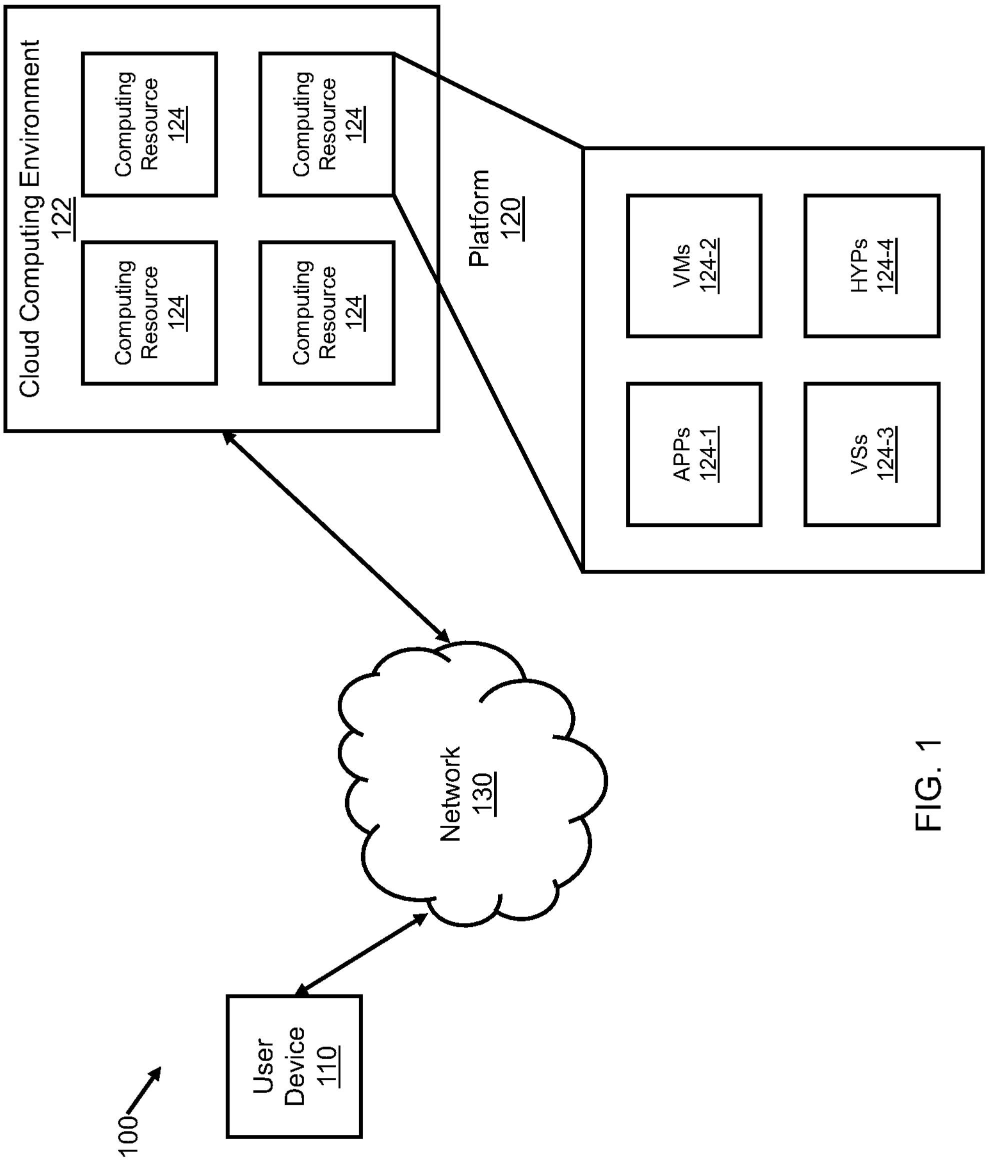
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles “a” and “an” are intended to include one or more items, and may be used interchangeably with “one or more.” Where only one item is intended, the term “one” or similar language is used. Also, as used herein, the terms “has,” “have,” “having,” “include,” “including,” or the like are intended to be open-ended terms. Further, the phrase “based on” is intended to mean “based, at least in part, on" unless explicitly stated otherwise. Furthermore, expressions such as "at least one of [A] and [B]" or "at least one of [A] or [B]" are to be understood as including only A, only B, or both A and B.

Voice conversion is a technique that converts non-linguistic information of a given utterance to a target style (e.g., speaker identity, emotion, accent or rhythm etc.), while preserving the linguistic content information. For this reason, VC gains a lot of attraction in applications such as privacy protection, speaker de-identification, audio editing, singing voice conversion/generation, etc. Disentangling content and speaking style information is essential for zero-shot non-parallel VC.

Example embodiments of the present disclosure provide a method, an apparatus, and a system for conditional DSVAE, a new model that enables content bias as a condition to prior modeling and reshapes the content embedding sampled from the posterior distribution in order to achieve a better content embedding with more phonetic information preserved. Embodiments demonstrate that content embeddings derived from the conditional DSVAE overcome the randomness and achieve much better phoneme classification accuracy, a stabilized vocalization, and a better zero-shot VC performance compared with the DSVAE baseline.

Figure 2:
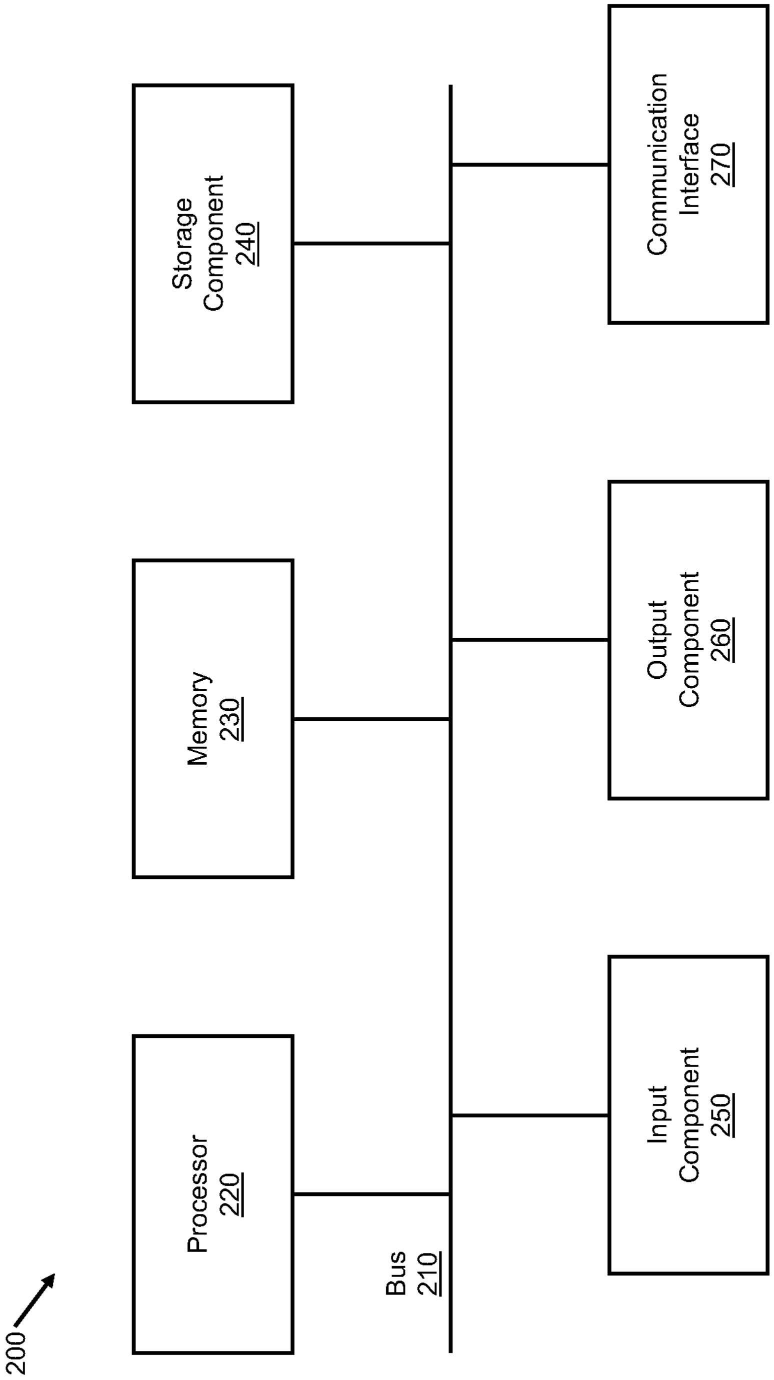
FIG. 2 is a block diagram of example components of one or more devices of FIG. 1.

FIG. 1 is a diagram of an example environment 100 in which systems, apparatuses, and/or methods, described herein, may be implemented. As shown in FIG. 2, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 2.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 2, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 100 may perform one or more functions described as being performed by another set of devices of environment 100.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
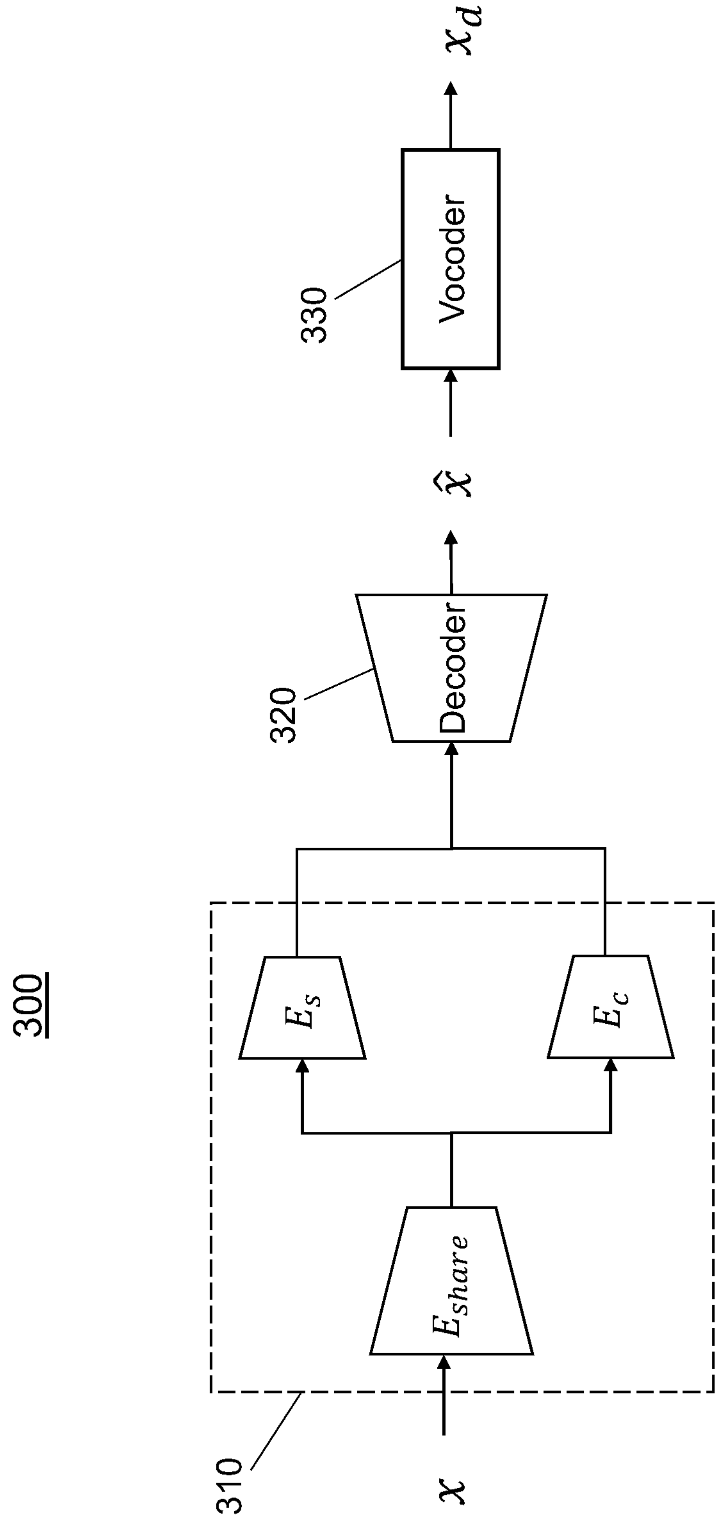
FIG. 3 is a diagram illustrations of a system for a C-DSVAE, according to an embodiment.
Figure 4:
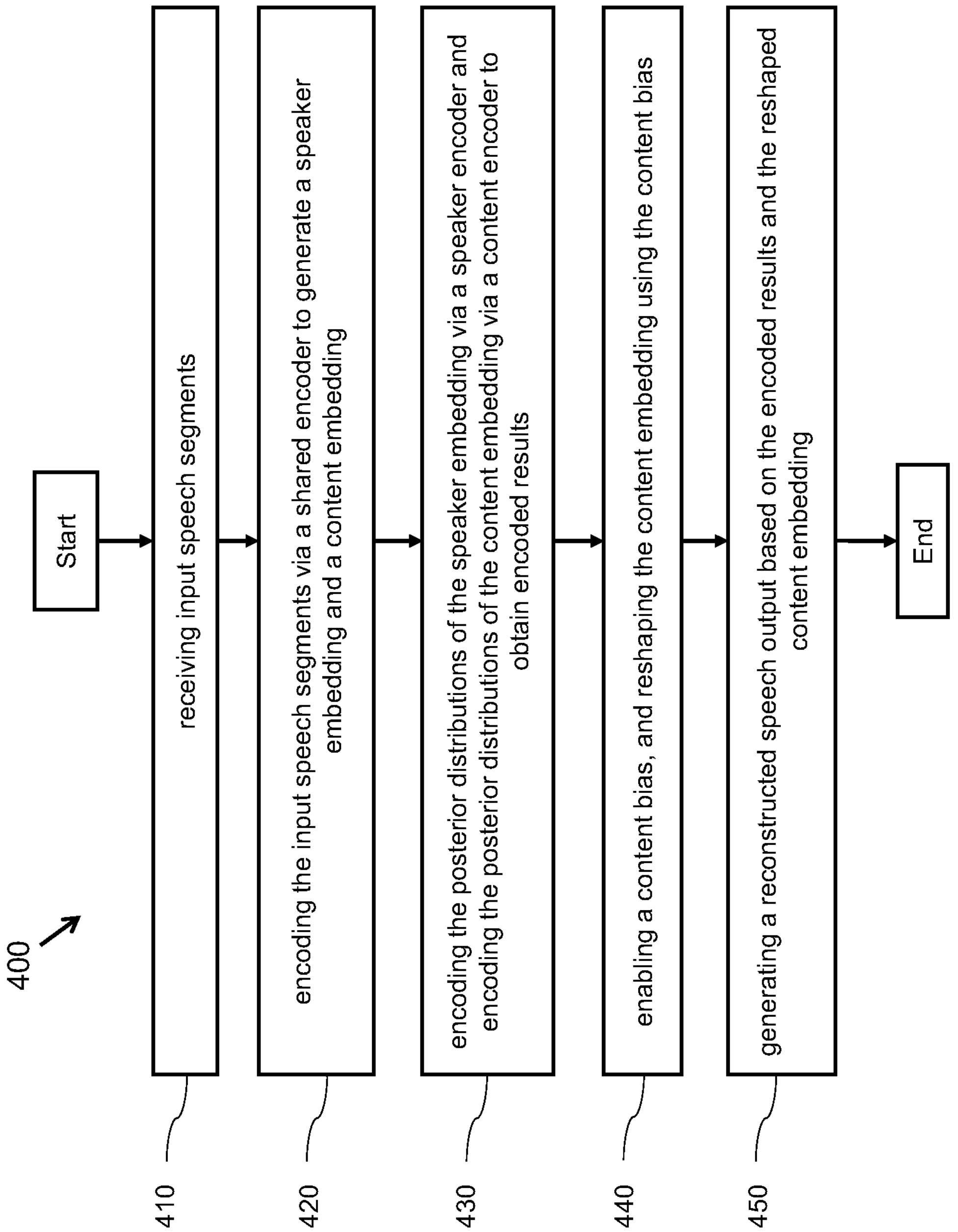
FIG. 4 is an exemplary flowchart illustrating a method for zero-shot voice conversion with a conditional disentangled sequential variational auto-encoder, according to one or more embodiments.
Figure 5:
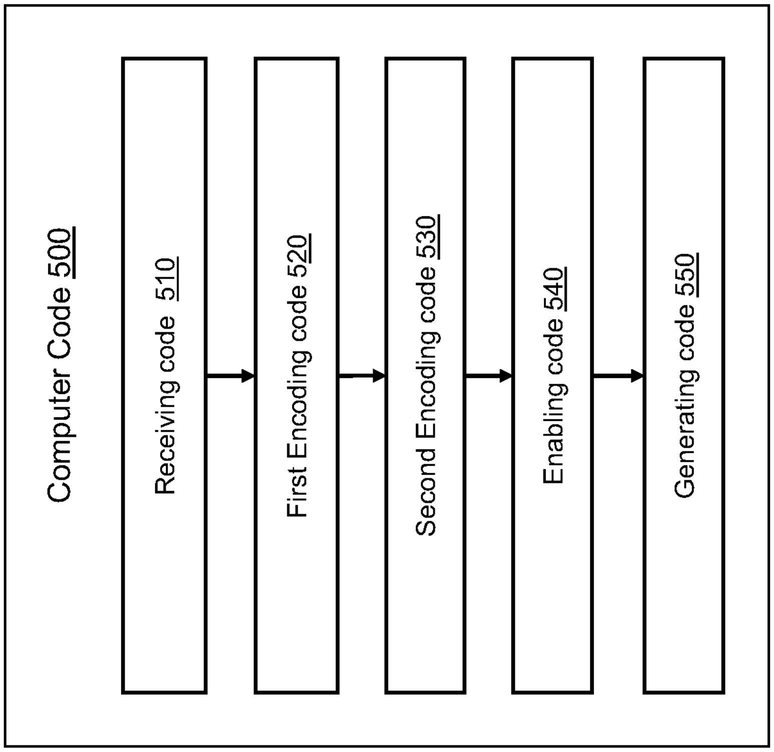
FIG. 5 is a block diagram of an example of computer code for zero-shot voice conversion with a conditional disentangled sequential variational auto-encoder, according to one or more embodiments.

In embodiments, any one of the operations or processes of FIGS. 3-5 may be implemented by or using any one of the elements illustrated in FIGS. 1 and 2.

As mentioned, the C-DSVAE system according to embodiments adopts the DSVASE baseline. FIG. 3 illustrates a diagram of a system of a conditional DSVAE 300 (hereinafter "C-DSVAE system 300") according to an embodiment.

As shown in FIG. 3, the C-DSVAE system 300 may include an encoder 310. The encoder 310 further including a shared encoder $E_{share}$, a speaker encoder Es, and a content encoder Ec. An input speech segment x passes into the shared encoder $E_{share}$. Then, the results of the shared encoder $E_{share}$ pass through the speaker encoder Es and content encoder Ec. The speaker encoder Es and content encoder Ec encode (e.g., by sampling, quantizing, and encoding) the posterior distributions of a speaker embedding and a content embedding, respectively. A content bias, as either forced alignment or pseudo labels, are used to reshape the content embedding sampled from the posterior distribution. The Kullback-Leibler divergence (KL-Divergence) between the prior probabilities of the encoded speaker embedding $Z_S$ and the encoded content embedding $Z_C$, the posterior distribution over the encoded speaker embedding $Z_S$ and the encoded content embedding $Z_C$, and the conditional prior and posterior distribution of content embedding may also be determined. During the training process, the encoded speaker embedding $Z_S$ and the encoded content embedding $Z_C$ are concatenated. During inferencing, the content embedding and a target embedding are concatenated to achieve VC. Subsequently, the concatenated results are sent to a decoder 320 to reconstruct the speech and generated a reconstructed speech segment $\hat{x}$. The one-hot form of the content bias is taken and concatenated to the prior modeling during the training process. Further, the reconstructed speech segment $\hat{x}$ may be generated in the form of a spectrogram. Thus, the reconstructed speech segment $\hat{x}$ may be passed through a vocoder 330 to convert the speech segment to digital data $X_d$ (e.g., a waveform).

Embodiments may be applied to, for example, the Voice Cloning Toolkit (VCTK) datasets. Descriptions of an example implementation of embodiments using the VCTK datasets, wherein 90% of the speakers are used for training and the remaining 10% are used for evaluation, are as follows. Segments may be randomly selected (e.g., 100 frames (1.6 s)) from the whole utterances for the training process. A mel spectrogram, logarithmically rendering frequencies above a certain threshold, is used as an acoustic feature with a window size/hop size of 64 ms/16 ms, and a feature dimension of 80.

According to the type of content bias, four C-DSVAE settings may be used. For example, C-DSVAE(Align) is used when the contact bias is the forced alignment, C-DSVAE(BEST-VQ) is used when the contact bias is the pseudo labels from, e.g., BEST-VQ, C-DSVAE(Mel) is used when the contact bias are cluster indices from, e.g., the Kmeans clustering on offline melspectrogram features, and C-DSVAE(WavLM) is used when the contact bias are cluster indices from, e.g., the Kmeans clustering on offline WavLM features. It is understood, however, that one or more other embodiments are not limited to this configuration and other C-DSVAE settings and types of content bias's may be considered.

According to some embodiments, the loss objective is defined by a loss function of the VC system (e.g., C-DSVAE system 300). The loss function may be based on three items: the reconstruction loss between an input mel spectrogram (e.g., input speech segment(s) x) and a reconstruction of the input mel spectrogram (e.g., the reconstructed speech segment $\hat{x}$), a KL-Divergence between the prior and posterior distribution of the speaker embedding, and a KL-Divergence between the conditional prior and posterior distribution of the content embedding. The loss function also includes a weighted factor for each item.

FIG. 4 is an exemplary flowchart illustrating a method 400 for voice conversion using a C-DSVAE, according to an embodiment.

In operation 410, the method 400 may include receiving input speech segments.

In operation 420, the method 400 may include encoding the input speech segments via a shared encoder to generate a speaker embedding and a content embedding.

In operation 430, the method 400 may include encoding a posterior distribution of the speaker embedding via a speaker encoder and encoding a posterior distribution of the content embedding via a content encoder to obtain encoded results.

In operation 440, the method 400 may include enabling a content bias, and reshaping the content embedding using the content bias.

In operation 450, the method 400 may include generating a reconstructed speech output based on the encoded results and the reshaped content embedding. The reconstructed speech output may be generated by, for example, concatenating the encoded results and the reshaped content embedding.

Although FIG. 4 shows example operations of the method, in some implementations, the method may include additional operations, fewer operations, different operations, or differently arranged operations than those depicted in FIG. 4. Additionally, or alternatively, two or more of the operations of the method may be performed in parallel or combined.

FIG. 5 is a block diagram of an example of computer code for disentangled variational speech representation learning for voice conversion, according to one or more embodiments. According to embodiments of the present disclosure, at least one processor with memory storing computer code may be provided. The computer code may be configured to, when executed by the at least one processor, perform any number of aspects of the present disclosure.

As shown in FIG. 5, the computer code 500 may include receiving code 510, first encoding code 520, second encoding code 530, enabling code 540, and generating code 550.

The receiving code 510 is configured to cause the at least one processor to receive input speech segments.

The first encoding code 520 is configured to cause the at least one processor to encode the input speech segments via a shared encoder to generate a speaker embedding and a content embedding.

The second encoding code 530 is configured to cause the at least one processor to encode a posterior distribution of the speaker embedding via a speaker encoder and encode a posterior distribution of the content embedding via a content encoder to obtain encoded results.

The enabling code 540 is configured to cause the at least one processor to enable a content bias, and reshape the content embedding using the content bias.

The generating code 550 is configured to cause the at least one processor to generate a reconstructed speech output based on the encoded results and the reshaped content embedding. The reconstructed speech output may be generated by, for example, concatenating the encoded results and the reshaped content embedding.

Although FIG. 5 shows example blocks of the computer code 500 of an apparatus or device according to embodiments, in some implementations, the apparatus may include additional blocks, fewer blocks, different blocks, or differently arranged blocks than those depicted in FIG. 5. Additionally, or alternatively, two or more of the blocks of the apparatus may be combined. In other words, while FIG. 5 shows distinct blocks of code, the various code instructions need not be distinct and could be intermingled.

Advantages of the methods and systems described according to embodiments of this disclosure are demonstrated below. For example, phoneme classification is performed on the content embedding and the results are shown below.

TABLE 1

Phoneme Classification on Content Embeddings

| Setting | Phn ACC % |
|---|---|
| DSVAE | 30.2 |
| C-DSVAE(BEST-RQ) | 35.6 |
| Melspectrogram | 44.1 |

TABLE 1-continued

| Phoneme Classification on Content Embeddings | |
|---|---|
| Setting | Phn ACC % |
| C-DSVAE(Mel) | 48.2 |
| C-DSVAE(Align) | 51.1 |
| C-DSVAE(WavLM) | 52.8 |

The results, as shown in Table 1, indicate that the proposed C-DSVAE learned the phonetically discriminative content embeddings at a higher percentage than, e.g., the DSAVE described in related art.

The results for VC are shown below in Table 2. The proposed C-DSVAE reaches state-of-the-art VC performance in terms of both naturalness and similarity.

TABLE 2

| Voice Conversion Performance | | | | |
|---|---|---|---|---|
| | seen to seen | | unseen to unseen | |
| model | naturalness | similarity | naturalness | similarity |
| AUTOVC [15] | 2.65 ± 0.12 | 2.86 ± 0.09 | 2.47 ± 0.10 | 2.76 ± 0.08 |
| AdaIN-VC [15] | 2.98 ± 0.09 | 3.06 ± 0.07 | 2.72 ± 0.11 | 2.96 ± 0.09 |
| DSVAE [15] | 3.40 ± 0.07 | 3.56 ± 0.06 | 3.22 ± 0.09 | 3.54 ± 0.07 |
| DSVAE(HiFi-GAN) | 3.76 ± 0.07 | 3.83 ± 0.06 | 3.65 ± 0.07 | 3.89 ± 0.05 |
| C-DSVAE(BEST-RQ) | 3.88 ± 0.06 | 3.93 ± 0.07 | 3.82 ± 0.08 | 3.98 ± 0.07 |
| C-DSVAE(Mel) | 3.86 ± 0.10 | 3.65 ± 0.07 | 3.78 ± 0.05 | 3.58 ± 0.08 |
| C-DSVAE(Align) | 4.03 ± 0.04 | 4.12 ± 0.07 | 3.93 ± 0.06 | 4.06 ± 0.07 |
| C-DSVAE(WavLM) | 4.08 ± 0.06 | 4.17 ± 0.06 | 3.98 ± 0.07 | 4.12 ± 0.05 |

Speaker verification is also performed and the results indicate that stable content embeddings with more phonetic structure information boost the VC performance in both subjective and objective evaluations. The results of the speaker verification are shown below in Table 3.

TABLE 3

| Speaker Verification | |
|---|---|
| Setting | ACC % |
| DSVAE | 85.0 |
| C-DSVAE(BEST-RQ) | 86.3 |
| C-DSVAE(Mel) | 83.8 |
| C-DSVAE(Align) | 91.5 |
| C-DSVAE(WavLM) | 92.3 |

On both TIMIT and VCTK datasets, embodiments achieve enhanced performance on objective evaluations (i.e., speaker verification (SV) on both speaker embedding and content embedding). For VC with the VCTK dataset, embodiments achieve competitive performance in terms of voice naturalness and similarity, and remains to be robust even with noisy source/target utterances.

Embodiments relating to the (C-DSVAE), as described herein, provide an improved framework that corrects the randomness in the content prior distribution with content bias. Embodiments are not limited to the above mentioned content biases. For example, alternative content biases extended from unsupervised learning, supervised learning and self-supervised learning may also be used. The VC experiments on the VCTK dataset described herein demonstrate a clear stabilized vocalization and a significantly improved performance with the new content embeddings. Phoneme classification also justifies the effectiveness of the proposed model in an objective way. As such, the conditional DSVAE overcome the effects of the randomness in the initialization of the prior distribution of the content branch in the DSVAE baseline (i.e., reduction of phonetic-structure information during the learning process) and achieve more accurate phoneme classification, a stabilized vocalization, and a better zero-shot VC performance compared with the competitive DSVAE baseline.

The foregoing disclosure provides illustrations and descriptions, but is not intended to be exhaustive or to limit the implementations to the precise form disclosed. Modifications and variations are possible in light of the above disclosure or may be acquired from practice of the implementations.

Some embodiments may relate to a system including at least one memory configured to store computer program code and at least one processor configured to access the computer program code and operate as instructed by the computer program code, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, software instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer readable media according to various embodiments. In this regard, each block in the block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the figures. In some alternative implementations, the functions noted in the blocks may occur out of the order noted in the figures. For example, two blocks shown in succession may, in fact, be executed concurrently or substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts or carry out combinations of special purpose hardware and computer instructions.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for voice conversion using a conditional disentangled sequential variational auto-encoder (C-DS-VAE), performed by at least one processor and comprising:
receiving input speech segments;
encoding the input speech segments via a shared encoder to generate a speaker embedding and a content embedding;
encoding a posterior distribution of the speaker embedding via a speaker encoder and encoding a posterior distribution of the content embedding via a content encoder to obtain encoded results;
enabling a content bias, and reshaping the content embedding by preserving phonetic information using the content bias sampled from the posterior distribution; and
generating a reconstructed speech output based on the encoded results and the reshaped content embedding,
wherein a total loss of the voice conversion is based on a reconstruction loss between the input speech segments and the reconstructed speech output, a prior distribution and the posterior distribution of the speaker embedding, and a Kullback-Leibler (KL)-Divergence between a conditional prior and the posterior distribution of the content embedding,
wherein the content bias is forced alignment, and the content bias is concatenated to prior modeling during a training process, and
wherein during the training process, the content embedding and a target embedding are concatenated when inferencing to obtain a voice conversion speech output, and the concatenated results of the content embedding and the target embedding are provided to a decoder to generate the reconstructed speech in a form of a spectrogram.

2. The method of claim 1, wherein the content bias is pseudo labels.

3. The method of claim 1, wherein the method is performed on voice cloning toolkit (VCTK) datasets.

4. The method of claim 1, wherein segments are randomly selected from the input speech segments for training the C-DSVAE.

5. The method of claim 1, further comprising converting the reconstructed speech output into a waveform.

6. An apparatus for voice conversion using a conditional disentangled sequential variational auto-encoder (C-DS-VAE), the apparatus comprising:
at least one memory configured to store program code; and
at least one processor configured to read the program code and operate as instructed by the program code, the program code including:
receiving code configured to cause the at least one processor to receive input speech segments;
first encoding code configured to cause the at least one processor to encode the input speech segments via a shared encoder to generate a speaker embedding and a content embedding;
second encoding code configured to cause the at least one processor to encode a posterior distribution of the speaker embedding via a speaker encoder and encode a posterior distribution of the content embedding via a content encoder to obtain encoded results;
enabling code configured to cause the at least one processor to enable a content bias, and reshape the content embedding by preserving phonetic information using the content bias sampled from the posterior distribution; and
generating code configured to cause the at least one processor to generate a reconstructed speech output based on the encoded results and the reshaped content embedding,
wherein a total loss of the voice conversion is based on a reconstruction loss between the input speech segments and the reconstructed speech output, a prior distribution and the posterior distribution of the speaker embedding, and a Kullback-Leibler (KL)-Divergence between a conditional prior and the posterior distribution of the content embedding, and
wherein the content bias is forced alignment, and the content bias is concatenated to prior modeling during a training process, and
wherein during the training process, the content embedding and a target embedding are concatenated when inferencing to obtain a voice conversion speech output, and the concatenated results of the content embedding and the target embedding are provided to a decoder to generate the reconstructed speech in a form of a spectrogram.

7. The apparatus of claim 6, wherein the content bias is pseudo labels.

8. The apparatus of claim 6, wherein the method is performed on voice cloning toolkit (VCTK) datasets.

9. The apparatus of claim 6, wherein segments are randomly selected from the input speech segments for training the C-DSVAE.

10. The apparatus of claim 6, further comprising converting code configured to cause the at least one processor to convert the reconstructed speech output into a waveform.

11. A non-transitory computer-readable medium storing instructions, the instructions comprising: one or more instructions that, when executed by at least one processor of an apparatus for voice conversion using a conditional disentangled sequential variational auto-encoder (C-DSVAE) storing instructions that, cause the at least one processor to:
receive input speech segments;
encode the input speech segments via a shared encoder to generate a speaker embedding and a content embedding;
encode a posterior distribution of the speaker embedding via a speaker encoder and encode a posterior distribution of the content embedding via a content encoder to obtain encoded results;
enable a content bias, and reshape the content embedding by preserving phonetic information using the content bias sampled from the posterior distribution; and
generate a reconstructed speech output based on the encoded results and the reshaped content embedding to generate the reconstructed speech output,
wherein a total loss of the voice conversion is based on a reconstruction loss between the input speech segments and the reconstructed speech output, a prior distribution and the posterior distribution of the speaker embedding, and a Kullback-Leibler (KL)-Divergence between a conditional prior and the posterior distribution of the content embedding,
wherein the content bias is forced alignment, and the content bias is concatenated to prior modeling during a training process, and
wherein during the training process, the content embedding and a target embedding are concatenated when inferencing to obtain a voice conversion speech output, and the concatenated results of the content embedding and the target embedding are provided to a decoder to generate the reconstructed speech in a form of a spectrogram.

12. The non-transitory computer-readable medium of claim 11, wherein the content bias is pseudo labels.

13. The non-transitory computer-readable medium of claim 11, wherein the method is performed on voice cloning toolkit (VCTK) datasets.

14. The non-transitory computer-readable medium of claim 11, wherein segments are randomly selected from the input speech segments for training the C-DSVAE.

* * * * *